Figure 1:
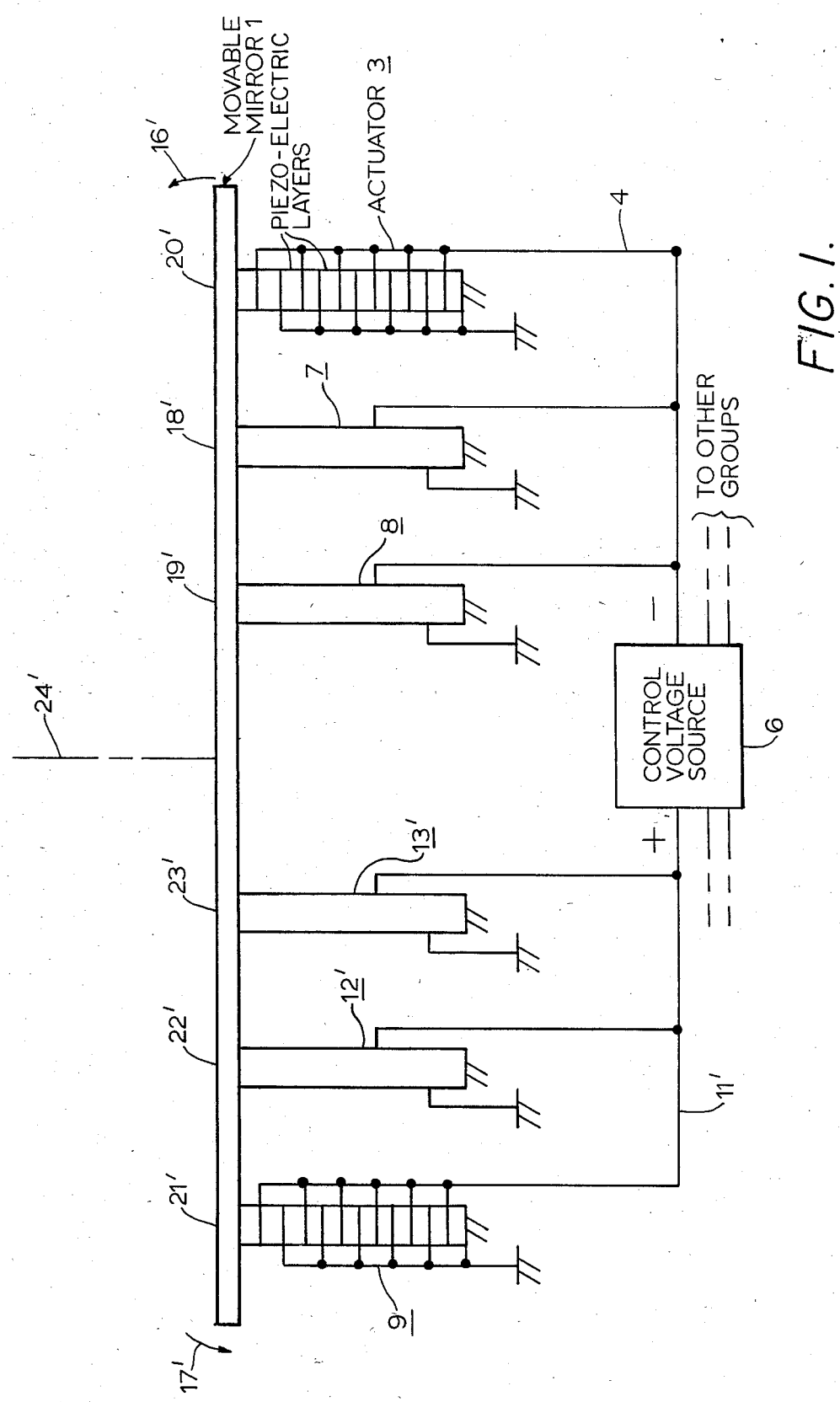

United States Patent [19]

Aldrich

[11] Patent Number: 4,588,268
[45] Date of Patent: May 13, 1986

[54] TIP-TILT MIRROR ACTUATION SYSTEM HAVING SIMPLIFIED DRIVER CIRCUITRY

[75] Inventor: Ralph E. Aldrich, Acton, Mass.

[73] Assignee: Itek Corporation, Lexington, Mass.

[21] Appl. No.: 588,589

[22] Filed: Mar. 12, 1984

[51] Int. Cl.⁴ ............................ G02F 1/29; G02B 5/08
[52] U.S. Cl. ..................................... 350/607; 350/360
[58] Field of Search ................ 350/607, 632, 6.6, 487, 350/360, 361, 637

[56] References Cited

U.S. PATENT DOCUMENTS

| | | | |
|---|---|---|---|
| 4,128,309 | 12/1978 | Lehureau | 350/607 |
| 4,257,686 | 3/1981 | Albetinetti et al. | 350/360 |
| 4,298,247 | 11/1981 | Michelet et al. | 350/607 |

OTHER PUBLICATIONS

Pearson et al., "Experimental Studies of a Deformable Adaptive Optical System", J. Opt. Soc. Am., vol. 67, No. 3, Mar. '77.

Primary Examiner—John K. Corbin
Assistant Examiner—David Lewis
Attorney, Agent, or Firm—Michael H. Wallach; Robert F. Rotella

[57] ABSTRACT

Groups of electromechanical actuators affixed to a movable mirror are coupled to the mirror along radial lines extending from the central portion thereof. The actuators in each of such groups have variable sensitivity of mechanical response per volt applied, such sensitivity increasing for each actuator which is positioned further and further away from the central portion, and thus for any desired motion, only one control voltage is required to drive all actuators in a particular group. Variable sensitivity is preferably attained by constructing all actuators to have the same number of piezo-electric layers and connecting more and more electrodes associated with the layers to the single control voltage for actuators positioned further and further away from the central portion of the optical element.

27 Claims, 2 Drawing Figures

TIP-TILT MIRROR ACTUATION SYSTEM HAVING SIMPLIFIED DRIVER CIRCUITRY

BACKGROUND OF THE INVENTION

The present invention relates to the field of control systems for actuating optical elements.

Electrically controlled movable optical elements such as tip-tilt mirrors are often employed for telescopic tracking or viewing of various objects. In accordance with the prior art, a substantial plurality of mirror actuators are affixed to one side of a mirror to be pointed in various directions. The actuators move the mirror by different amounts so that the mirror as a whole points in a given selected direction, and such amounts are proportional to electrical control signals applied to the input circuits of the actuators. Since there are many actuators affixed to the movable mirror, numerous control voltages are applied to the actuators to cause a given selected mirror orientation. This means that a large number of control voltages which differ from one another must be generated, and a number of drivers equal to the number of actuators are provided to apply the different control voltages to the actuators.

It is an object of the present invention to sharply reduce the number of different control voltages to be applied to the array of mirror actuators, thereby to reduce the number of control voltage drivers, and the complexity of the electrical control system.

SUMMARY OF THE INVENTION

In accordance with a preferred embodiment of the present invention, the number of prior art electrical drive circuits and control voltages are sharply reduced by providing a number of groups of actuators, wherein each group is coupled to the optical element along radial lines extending from the central portion of the optical element. The actuators in each of such groups have variable sensitivity or mechanical response per volt applied thereto, such sensitivity increasing for each actuator which is positioned further and further away from the central portion of the optical element, along a radial path. Thus, for any desired motion of the optical element, only one control voltage having a given value and one electrical driver is required to drive all of the actuators in a particular group extending along a particular radial path. The variable actuator sensitivity is obtained by constructing all actuators to have the same number of piezo-electric layers, and connecting more and more electrodes associated with the layers to a single control voltage for actuators positioned further and further away from the central portion of the optical element, so that the response to a given voltage will increase away from the center of the element, and yet only a single control voltage and driver is required. The actuators themselves need not be dissimilar, since only the number of connections thereto will determine the mechanical response or sensitivity, for any particular applied voltage. All of the layers of piezo-electric material in the actuator stacks are preferably coherent, and formed from the same material, so that the mechanical response or sensitivity of each layer is the same for a given voltage applied thereto.

Figure 2:
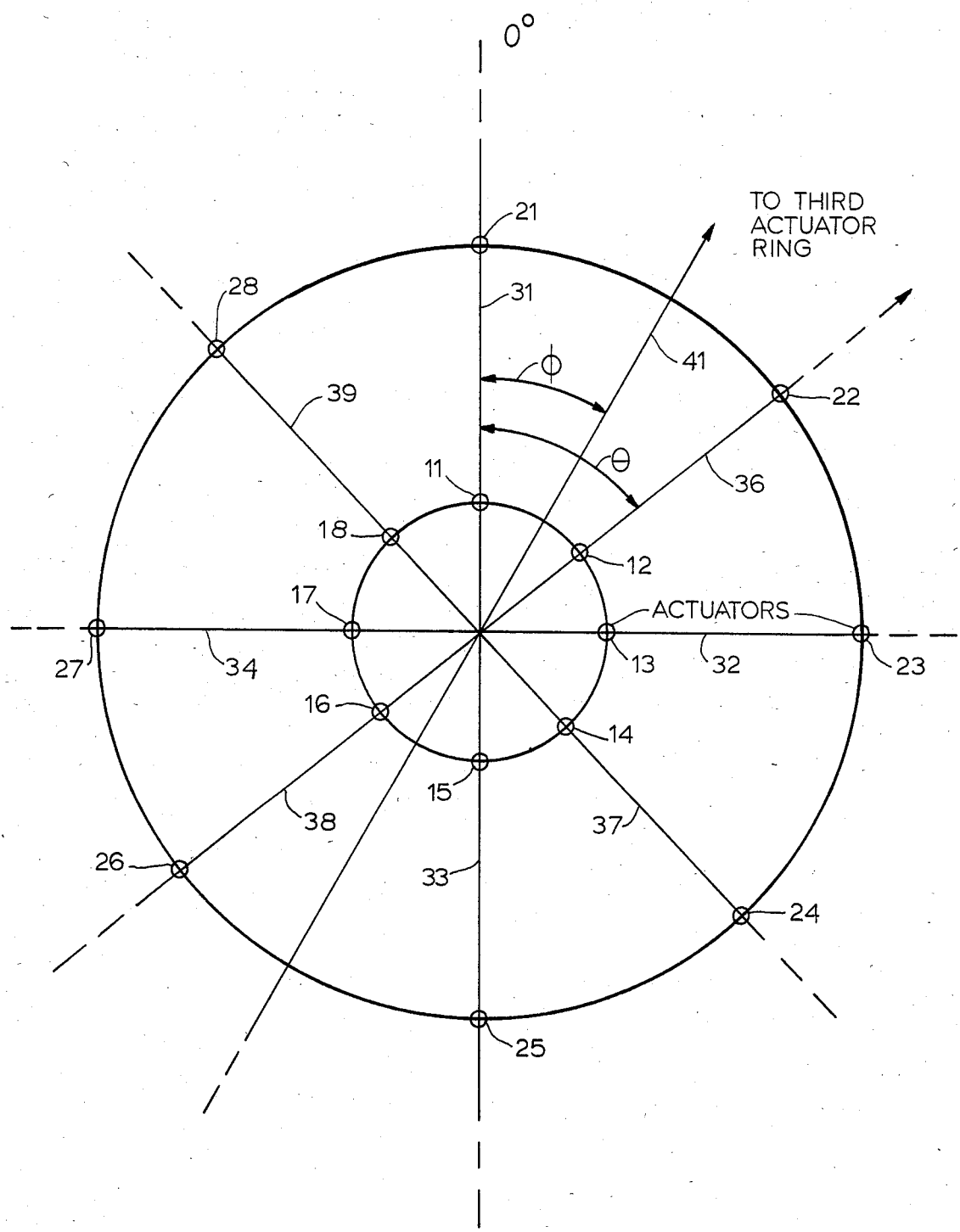

Other objects, features and advantages of the present invention will become apparent upon study of the following description taken in conjunction with the drawings in which:

FIG. 1 illustrates a number of electro-mechanical actuators affixed to the lower surface of a movable mirror; and FIG. 2 illustrates one prior art arrangement of a plurality of actuators.

SPECIFIC DESCRIPTION

Referring now to FIG. 1, a movable mirror 1 is schematically illustrated, having a lower surface 2 affixed to six electro-mechanical actuators. Each actuator comprises a plurality of piezo-electric layers as shown by representative actuators 3 and 9 in FIG. 1, separated by electrodes which produce expansion or contraction of the layers depending upon the applied voltage polarity, as is well known to those skilled in the art. In the case of actuator 3, the maximum number of electrodes are coupled to lead 4 of control voltage source 6, whereas a lesser number of layers are electrically connected to lead 4 for actuator 7 and still fewer layers for actuator 8. In like manner, actuator 9 at the left hand portion of FIG. 1 has the maximum number of electrical connections to lead 11' which is also coupled to control voltage source 6, whereas actuators 12' and 13' have lesser numbers of piezo-electric layers electrically connected to lead 11'. Let it be assumed that it is desirable to tip movable mirror 1 in a counterclockwise direction as indicated by arrows 16' and 17'. Under these circumstances, the right hand portion 20' of movable mirror 1, would be displaced upwardly to a greater extent relative to mirror portion 18', since more electrodes are coupled to source 6 compared to the lesser number of electrodes of actuator 7 being energized by the source. In like mnner, mirror portion 19' would be displaced even fewer, since even less electrodes are energized, in order to cause the mirror to changes its axial direction without bending, which generates detrimental internal stress. In like manner, mirror portion 21' at the extreme left hand portion of FIG. 1 would be moved downwardly as indicated by arrow 17' to an extent greater than mirror portions 22' and 23' owing to the wiring variation.

This operation may be effected by applying a voltage of one polarity to actuators 3, 7 and 8, to cause an expansion of the stack in an upward direction, whereas a voltage of an opposite polarity applied to actuators 9, 12', and 13', would cause a contraction of the stack of piezo-electric layers to produce the downward motion of left hand portions of the mirror. Alternately, one can wire actuators 9, 12' and 13' with reverse polarity with respect to their internal polarization in which case a drive voltage of a single polarity will produce the rotation of the mirror. The expansion and contraction of piezo-electric material, depending upon the polarity of the electrical field applied thereto, with respect to the direction of the internal polarization field, is of course well known.

When it is desirable to cause motion of the right hand portion of the mirror in FIG. 1 downwardly and hence the left hand portion of the mirror upwardly, in an opposite direction, the polarity of the control voltages would be reversed.

In accordance with the preferred embodiment of the invention, each piezo-electric layer is preferably formed from the same body so that the responsiveness to a given voltage value of any one layer is equal to the responsiveness of all other layers in all other stacks. Any changes in the responsiveness of one layer with respect to an other, could induce erroneous changes between the response of one actuator compared to another, to induce detrimental stress inducing bending of the mirror, which is highly undesirable as mentioned above.

Lower portions of each stack of piezo-electric layers are affixed to mechanical ground, and the connections to the control voltage source are made from upper portions of the stack toward mechanical ground as indicated in FIG. 1.

While a single line of actuators such as illustrated in FIG. 1 may at least theoretically be employed for certain limited uses to tip the mirror back and forth only about a single axis, generally rings of actuators of FIG. 2 are positioned beneath the mirror, such actuators having upper surfaces thereof affixed to the lower mirror surface as in FIG. 1, so that the mirror axis 24' may be pointed in any direction. Thus, actuators 11 and 21 are positioned on radial line 31, actuators 13 and 23 are positioned along radial line 32, actuators 15 and 25 are positioned along radial line 33, and actuators 17 and 27 are positioned along radial line 34. In like manner actuators 12 and 22 are positioned along radial line 36, actuators 14 and 24 are positioned along radial line 37, actuators 16 and 26 are positioned along radial line 38 and actuators 18 and 28 are positioned along radial line 39. Accordingly, the actuators in the first or inner ring are assigned the tens digit 1, whereas actuators in the second ring are assigned the tens digit 2, and the units digit, such as 1 in actuator 21 indicates that the actuator is in the first group extending along radial line 31 along with actuator 11. In like manner radial line 37, for example, intersects actuators 14 and 24 which form the fourth group. In the illustrated example of FIG. 2, eight actuators are positioned within each ring illustrated; as a practical matter at least a third ring of eight actuators not shown, would also be employed. Thus the three actuators, 3, 7 and 8 of FIG. 1, would be positioned along a particular radial line, whereas actuators 9, 12' and 13' would be positioned along a second radial line in 180° opposition to the first radial line.

The actuator arrangement in FIG. 2 illustrates the prior art configuration of an array of actuators. Only two rings have been illustrated in the interest of simplicity and will suffice to support an appropriate explanation of the nature of the array. In accordance with known prior art techniques, let it be assumed that it is desirable to tip the mirror in and out of the plane of FIG. 2 and to rotate about horizontal radial line 32. A positive going control signal would be applied to actuator 11 having a given value, whereas a larger control voltage would be applied to actuator 21 so as to move the mirror portion at 21 to a greater extent relative to that portion of the mirror affixed to actuator 11. In like manner, actuator 15 would cause an opposite displacement of the mirror portion adjacent 15, and actuator 25 would cause an even greater displacement of the portion adjacent 25 in an opposite direction, so that four different control voltages would be applied to the four transducers for actuators 11, 21, 15 and 25. In accordance with the present invention, the four control voltages and associated drivers are reduced in number by applying a single, e.g., a positive going control voltage, to actuators 11 and 21 and applying a single negative control voltage to actuators 15 and 25; or, for the reversed wiring polarity case mentioned above, a single positive going control voltage to all actuators. Should a third, fourth and fifth actuator ring be employed, greater economies are realized since all of the actuators along the radial line 31, for example, would be coupled to a single drive circuit and would respond to a single control voltage; likewise with respect to actuators associated with radial line 33 including those in third and subsequent rings, not shown.

Thus the aforesaid teachings should make it apparent to the reader that a single control voltage is applied at any one time to all actuators within a particular group of actuators, which in the example are those extending along a particular radial line. This economy is made possible preferably by varying the number of connections between the control voltage source and the individual transducers of the actuators in the manner described. For actuators further and further away from the central portion of the mirror, more and more piezoelectric layers would be connected to the drive circuit to provide the greater and greater amounts of motion required to change the direction of the optical axis 24'. The dual polarity aspect discussed before, enables the push-pull operation of the optical element in one direction or the other depending upon the applied voltage polarity whereas the degree of change in direction is a function of the magnitude of the voltage applied to all actuators in any given group along this particular radial line.

While the nature of the control voltages applied to the various actuators in the rings do not directly involve the present invention, the following prior art material is presented in order to give the reader further background.

For the maximum rotation of the mirror about the horizontal radial lines 32 and 34, the maximum voltage would be applied to the outermost actuators and lesser voltages would be applied to those actuators closer and closer to the central mirror portions. For lesser amounts of rotation, lesser voltages would of course be applied. In the special case of rotation about horizontal radial lines 32 and 34, no voltages would be applied to actuators 13, 23, 17 and 27, whereas reduced voltages would be applied to the intermediate actuators 22, 28, 24 and 26. The maximum voltage $V_o$ is defined as equal to the maximum deflection called for divided by the sensitivity or responsiveness of the edge actuator, in microns of displacement/volt. In the special case of rotation about the horizontal radial lines 32 and 34, $V_{21}$. ($V_o$) could for example equal plus 100 volts and the voltage applied to actuator 11 would also be 100 volts since a lesser number of piezo-electric layers are connected to the driver applying 100 volts to actuator 21. In like manner, the voltage applied to actuator 25 could be minus 100 volts to effect a complimentary opposite displacement, whereas the voltage applied to actuator 15 would also be 100 volts since a lesser number of piezo-electric layers are conncted to the voltage source. To effect this particular rotation about the horizontal radial lines 32 and 34, $V_{22}$ and $V_{28}$ would be, for example, positive and equal to $V_{21}$ cos theta (assuming all radial lines are angularly displaced from each other by equal angles) whereas $V_{24}$ and $V_{26}$ would be equal to $V_{25}$ cos theta and would of course be negative. In the specific case of rotation of the mirror in and out of the plane of FIG. 2 and about vertical radial lines 31 and 33, the voltage pattern would be rotated 90° , such that the voltages previously applied to actuators 11 and 21 would now be applied to actuators 13 and 23 and so forth.

In the general case, rotation for a given positional command could be about some axis perpendicular to line 41, for example, displaced angularly from line 31 by some angle phi shown in FIG. 2. The maximum voltage for maximum mirror displacement to be applied to actuator 22, instead of being $V_o \cos \theta$ for rotation about 32 and 34, would now be $+V_o \cos(\theta - \phi)$; the maximum voltage applied to actuator 23 would be $V_o \cos(2\theta - \phi)$ and so on. This voltage for the general case equals $V_o \cos(n\theta - \phi)$ where n is the number of the radial line starting with 36, and theta is the angular separation between radial lines.

While particular embodiments of the present invention have been shown and described, it is apparent that various changes and modifications may be made, and it is therefore intended that the following claims cover all such modifications and changes as may fall within the true spirit and scope of the invention. For example, the number of groups of actuators and the number of actuators in each group may vary widely. While variation in actuator sensitivity is preferably as described, other types of actuators having variable sensitivity could be arranged in a given group.

1. A position control system for selectively controlling the orientation of a controlled element having a given portion comprising:
   N groups of electromechanical actuators, N being an integer of one or more, each group having more than one actuator with each actuator being fastened to said controlled element, each of said actuators in each group having a sensitivity which increases in relation to a said actuator's position further and further away from said given portion; and
   means for applying a set of N actuator control voltages to said actuators, each control voltage of said set being applied to all actuators within a corresponding group of actuators so that each actuator within a group has the same control voltage applied to it as is applied to all other actuators within said group.

2. The combination as set forth in claim 1, wherein each actuator comprises a plurality of electromechanical transducers mechanically coupled together.

3. The combination as set forth in claim 2, wherein the actuators within each actuator group have increasing numbers of transducers electrically coupled to said means for applying said control voltages, for actuators positioned further and further away from said given portion of said controlled element.

4. The combination as set forth in claim 3, wherein each transducer comprises a layer of material exhibiting the piezo-electric effect positioned between at least two electrodes.

5. The combination as set forth in claim 4, wherein all of said layers of material exhibiting the piezo-electric effect are coherent and formed from the same material, thereby to exhibit the same sensitivity.

6. The combination as set forth in claims 2, 3, 4 or 5, wherein said actuators include at least sixteen of said transducers.

7. The combination as set forth in claims 1, 2, 3, 4 or 5, wherein N is at least four.

8. The combination as set forth in claims 1, 2, 3, 4 or 5, wherein the control voltages applied to actuators affixed to one side portion of said controlled element are positive and the control voltages applied to actuators at the other side of said controlled element are negative, thereby to produce a push-pull movement of said optical element.

9. The combination as set forth in claims 2, 3, 4 or 5, wherein said controlled element comprises a mirror.

10. The combination as set forth in claim 6, wherein said controlled element comprises a mirror.

11. The combination as set forth in claim 8, wherein said controlled element comprises a mirror.

12. A position control system for selectively controlling the orientation of an optical element having a central portion comprising:
    N groups of electromechanical actuators, N being an integer, each group having more than one actuator with each actuator being fastened to said optical element along a radial line extending from said central portion of said optical element, each actuator in each group having a sensitivity which increases in relation to a said actuator's position further and further away from said central portion along said radial line; and
    means for applying a set of N actuator control voltages to said actuators, each control voltage of said set being applied to all actuators within a corresponding group of actuators so that each actuator within a group has the same control voltage applied to it as is applied to all other actuators within said group.

13. The combination as set forth in claim 12, wherein each actuator comprises a plurality of electromechanical transducers mechanically coupled together.

14. The combination as set forth in claim 13, wherein the actuators within each actuator group have increasing numbers of transducers electrically coupled to said means for applying said control voltages, for actuators positioned further and further away from said central portion of said optical element.

15. The combination as set forth in claim 14, wherein each transducer comprises a layer of material exhibiting the piezo-electric effect positioned between at least two electrodes.

16. The combination as set forth in claim 15, wherein all of said layers of material exhibiting the piezo-electric effect are coherent and formed from the same material, thereby to exhibit the same sensitivity.

17. The combination as set forth in claims 13, 14, 15 or 16, wherein said actuators include at least sixteen of said transducers.

18. The combination as set forth in claims 12, 13, 14, 15 or 16 wherein N is at least four.

19. The combination as set forth in claims 12, 13, 14, 15 or 16, wherein the control voltages applied to actuators affixed to one side portion of said optical element are positive and the control voltages applied to actuators at the other side of said optical element are negative, thereby to produce a push-pull movement of said optical element.

20. The combination as set forth in claims 12, 13, 14, 15 or 16, wherein said optical element comprises a mirror.

21. The combination as set forth in claim 17, wherein said optical element comprises a mirror.

22. The combination as set forth in claim 20, wherein said optical element comprises a mirror.

23. A position control system for selectively controlling the orientation of an optical element having a central portion comprising:
    N groups of electromechanical actuators, N being an integer of at least eight, each group having more than one actuator with each actuator being fastened to said optical element along a radial line extending from said central portion of said element, each of said actuators in each group having a sensitivity which increases in relation to said actuator's position further and further away from said central portion along said radial line, each actuator including a plurality of piezo-electric layers positioned between a pair of electrodes; and means for applying a set of N actuator control voltages to said actuators, each control voltage of said set being applied to all actuators within a corresponding group of actuators so that each actuator within a group has the same control voltage applied to it as is applied to all other actuators within said group, said control voltages applied to transducers at one side portion of said optical element being positive, and other control voltages applied to transducers at an opposite side of said optical element being negative, thereby to provide a push-pull movement of said optical element.

24. The combination as set forth in claim 23, wherein the actuators within each actuator group have increasing numbers of transducers electrically coupled to said means for applying said control voltages, for actuators positioned further and further away from said central portion of said optical element.

25. The combination as set forth in claims 23 or 24, wherein all of said piezo-electric layers are formed from the same material.

26. The combination as set forth in claims 23 or 24, wherein said optical element comprises a mirror.

27. The combination as set forth in claim 25, wherein said optical element comprises a mirror.

* * * * *